US008874175B2

(12) United States Patent
Muralidhar et al.

(10) Patent No.: US 8,874,175 B2
(45) Date of Patent: Oct. 28, 2014

(54) CONVERTING SAMPLES OF A SIGNAL AT A SAMPLE RATE INTO SAMPLES OF ANOTHER SIGNAL AT ANOTHER SAMPLE RATE

(71) Applicant: STMicroelectronics Asia Pacific Pte Ltd., Singapore (SG)

(72) Inventors: Karthik Muralidhar, Singapore (SG); Sapna George, Singapore (SG); Saurav Sahu, Singapore (SG); Frank Teo, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 169 days.

(21) Appl. No.: 13/672,326

(22) Filed: Nov. 8, 2012

(65) Prior Publication Data
US 2014/0128004 A1    May 8, 2014

(51) Int. Cl.
*H04B 1/38* (2006.01)
*H04M 1/00* (2006.01)
*H04B 17/00* (2006.01)

(52) U.S. Cl.
CPC .................................... *H04B 17/00* (2013.01)
USPC ........ 455/570; 455/63.1; 455/67.13; 455/296

(58) Field of Classification Search
USPC ........ 455/67.11, 296, 67.13, 570, 114.2, 295, 455/278.1, 277.2, 226.1–226.3, 63.1; 341/61, 111, 113
See application file for complete search history.

(56) References Cited

U.S. PATENT DOCUMENTS

| 6,028,542 | A  | * | 2/2000 | Fukui et al. | 341/123 |
|---|---|---|---|---|---|
| 7,262,716 | B2 | * | 8/2007 | Yu et al. | 341/61 |
| 7,272,202 | B2 | * | 9/2007 | Knapp et al. | 375/359 |
| 7,408,485 | B1 | * | 8/2008 | Yu et al. | 341/61 |
| 7,809,346 | B2 | * | 10/2010 | Risbo et al. | 455/296 |
| 2006/0247810 | A1 | * | 11/2006 | Risbo et al. | 700/94 |
| 2010/0029210 | A1 | * | 2/2010 | Kaltiokallio et al. | 455/62 |

OTHER PUBLICATIONS

Matthias Pawig, Gerald Enzner, and Peter Vary, "Adaptive Sampling Rate Correction for Acoustic Echo Control in Voice-Over-IP", IEEE Transactions on Signal Processing, vol. 58, No. 1, Jan. 2010, 11 pages.

(Continued)

*Primary Examiner* — Pablo Tran
(74) *Attorney, Agent, or Firm* — Graybeal Jackson LLP

(57) ABSTRACT

In an embodiment, an apparatus includes a determiner, converter, adapter, and modifier. The determiner is configured to generate a representation of a difference between a first frequency at which a first signal is sampled and a second frequency at which a second signal is sampled, and the converter is configured to generate a second sample of the first signal at a second time in response to the representation and a first sample of the first signal at a first time. The adapter is configured to generate a sample of a modifier signal in response to the second sample of the first signal, and the modifier is configured to generate a modified sample of the second signal in response to a sample of the second signal and the sample of the modifier signal. For example, such an apparatus may be able to reduce the magnitude of an echo signal in a system having an audio pickup (e.g., a microphone) near an audio output (e.g., a speaker).

32 Claims, 7 Drawing Sheets

(56) References Cited

OTHER PUBLICATIONS

Naeem Adel Nadhem, and Sureswaran Ramadass, "A Review on Audio Sampling Rates Mismatch and Its Effect on the Acoustic Echo Cancellation of Persenol Computers," Australian Journal of Basic and Applied Sciences., pp. 1599-1605, 2011.

Ding Heping, and David I. Havelock, "Drift-compensated adaptive filtering for improving speech intelligibility in cases with asynchronous inputs," EURASIP journal on advances in signal processing, Hindawi Publishing Corporation, Jan. 2010, 12 pages.

Stokes Jack W, and Henrique S. Malvar, "Acoustic echo cancellation with arbitrary playback sampling rate," IEEE ICASSP, vol. 4, 2004, pp. 153-156.

Timo I. Laakso, Vesa Valimaki, Matti Karjalainen, and Unto K. Laine, "Splitting the unit delay [FIR/all pass filters design]," IEEE Signal Processing Magazine, vol. 30, No. 1, Jan. 1996, pp. 30-60.

Juuso T. Olkkonen, and Hannu Olkkonen, "Fractional Delay Filter Based on the B-Spline Transform", IEEE Signal Processing Letters, vol. 14, No. 2, Feb. 2007, 4 pages.

Ayush Bhandari, and Pina Marziliano, "Fractional delay filter based on generalized cardinal exponential splines," IEEE Signal Processing Letters, vol. 17, No. 3, Mar. 2010, pp. 225-228.

\* cited by examiner

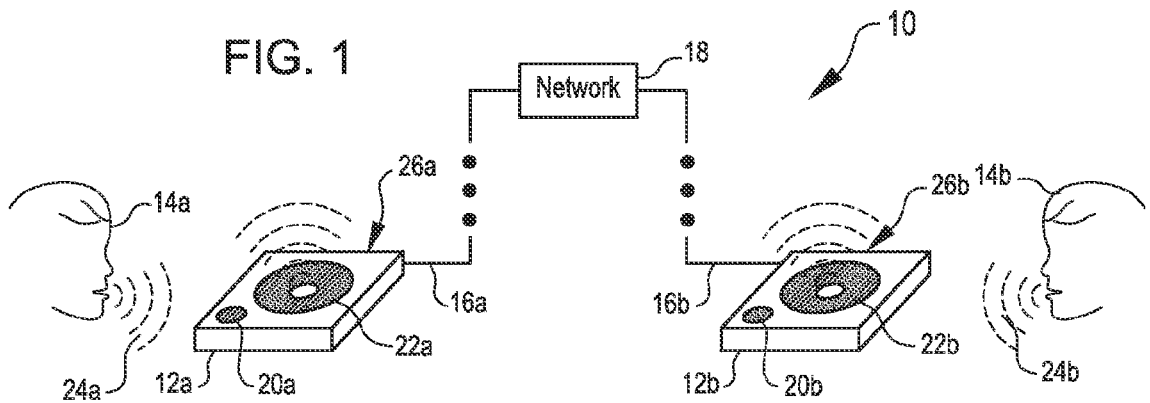
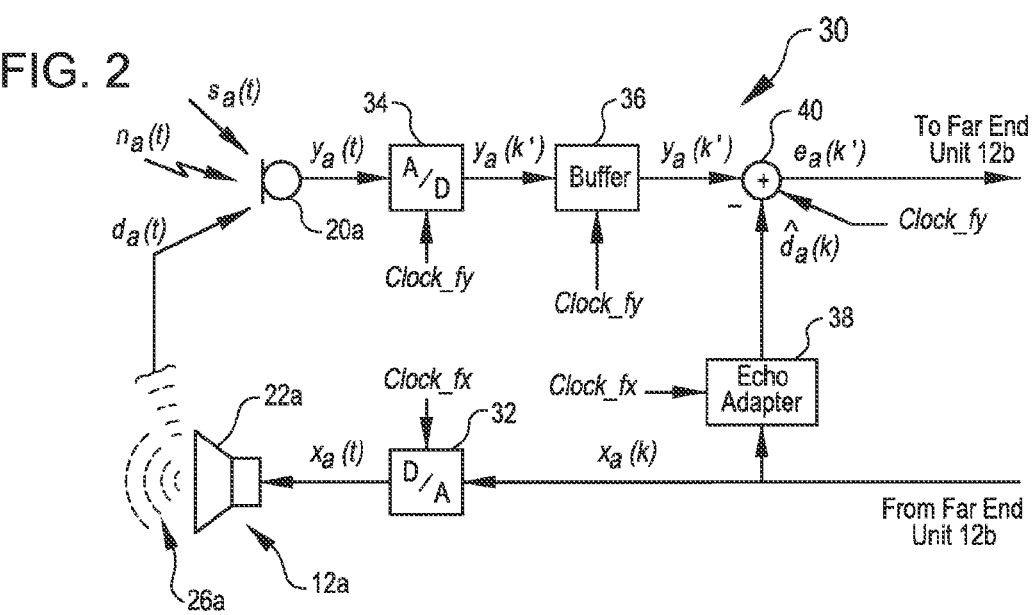

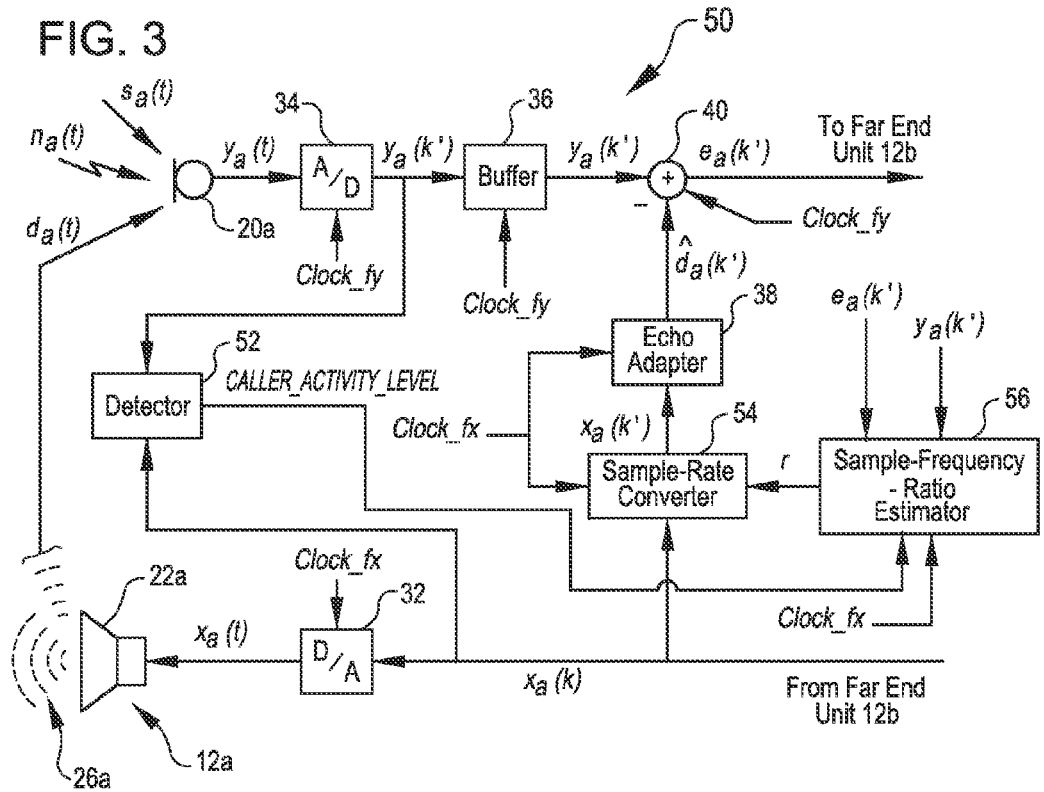

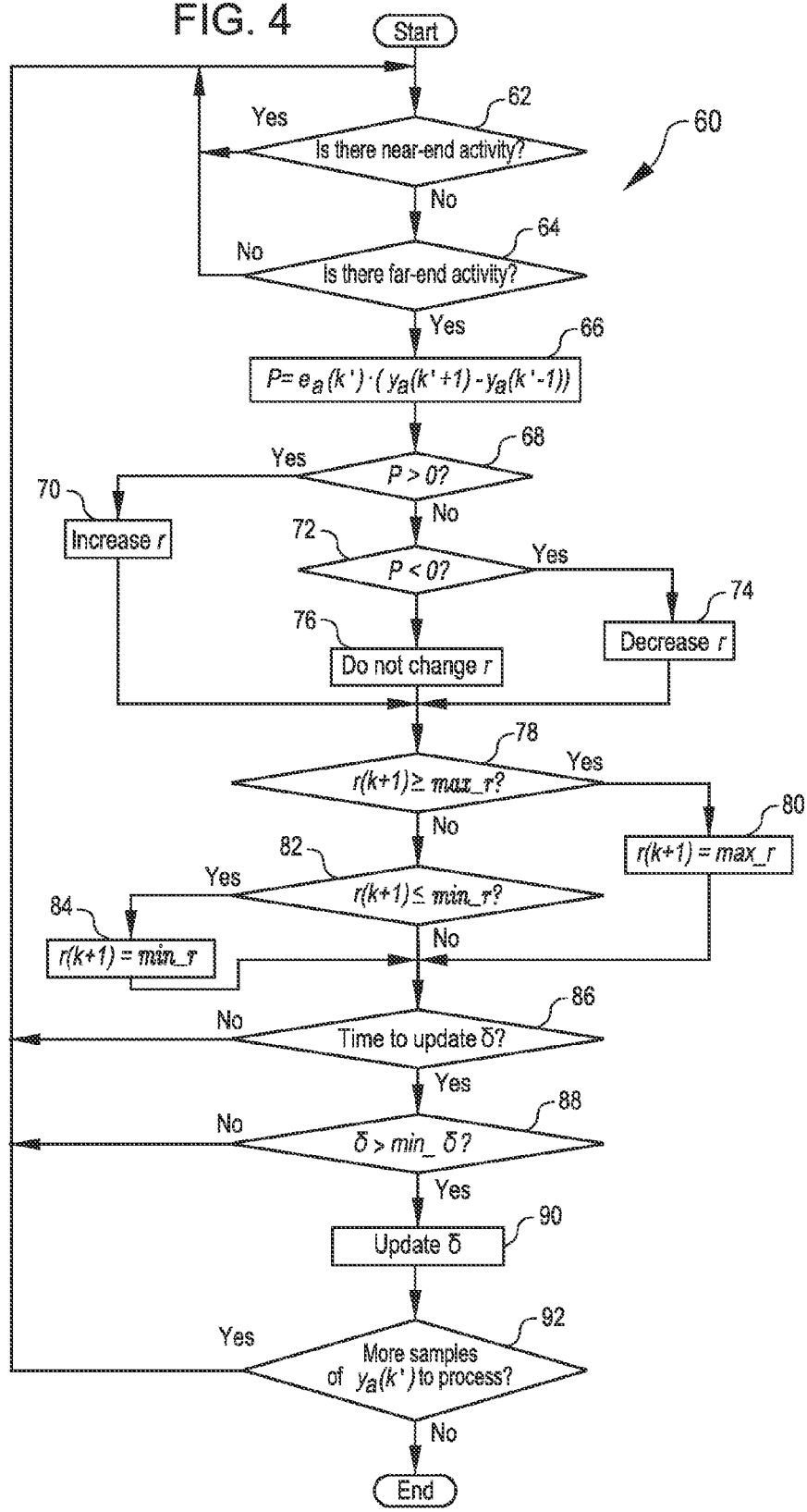

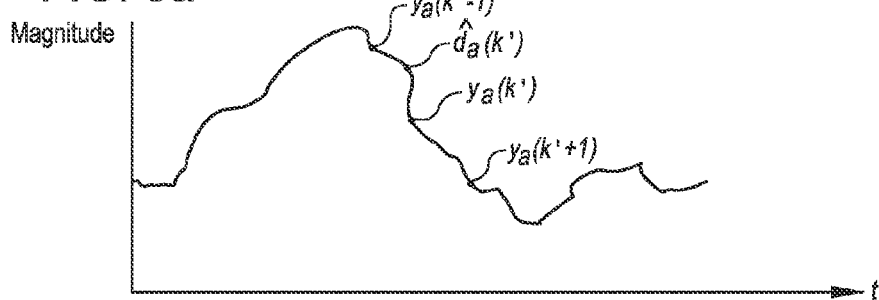
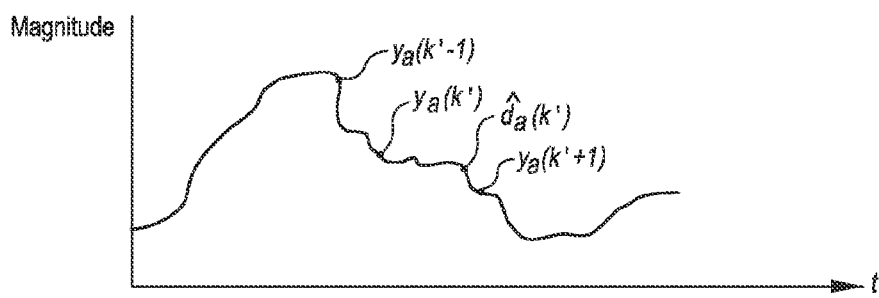
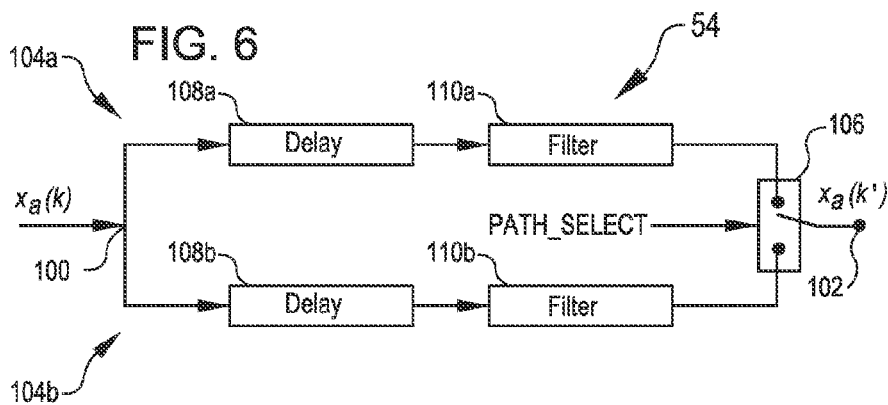
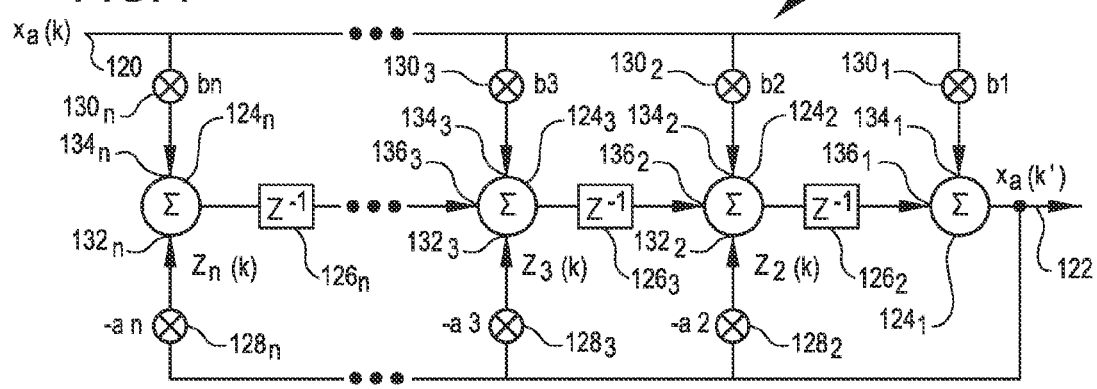

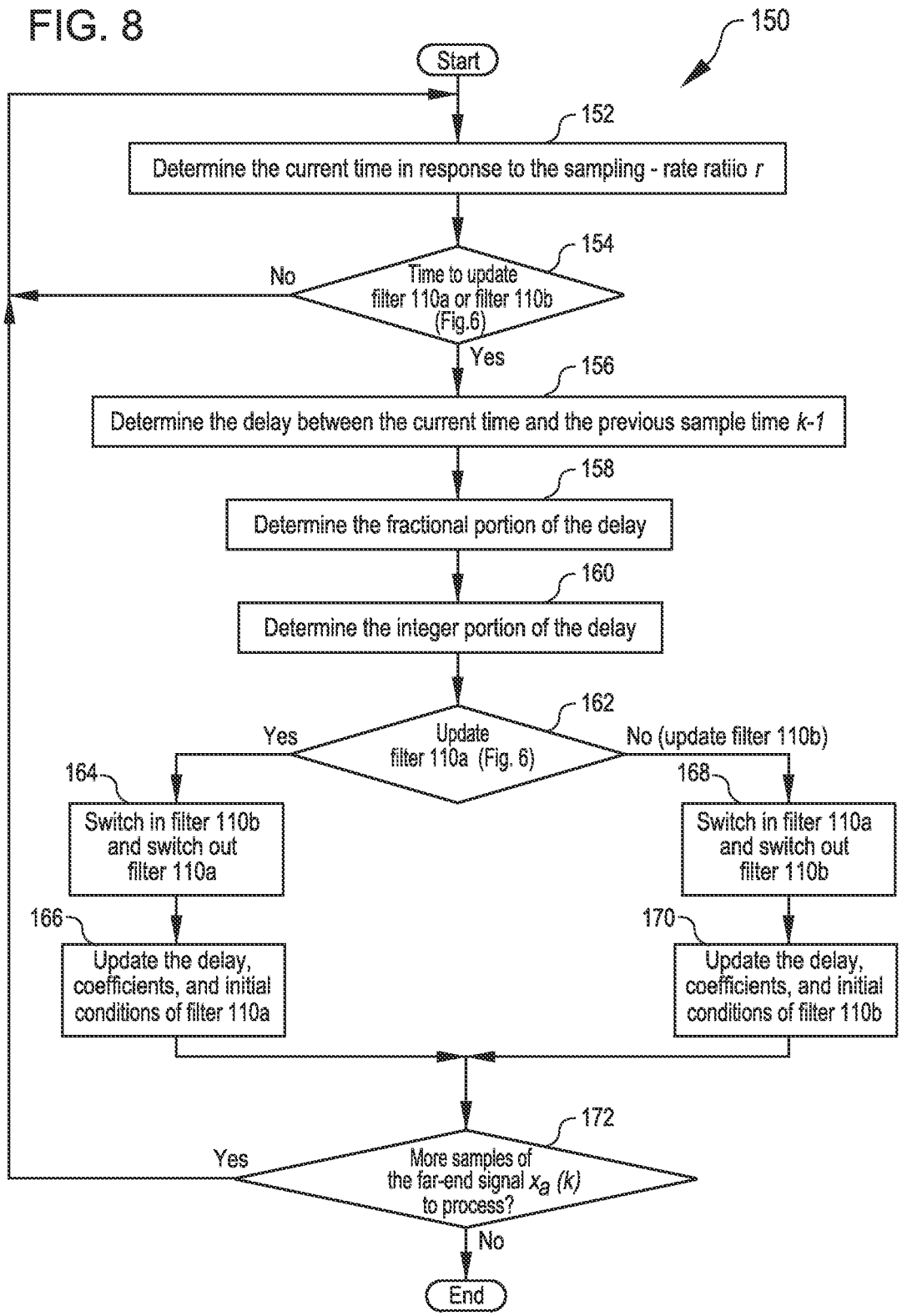

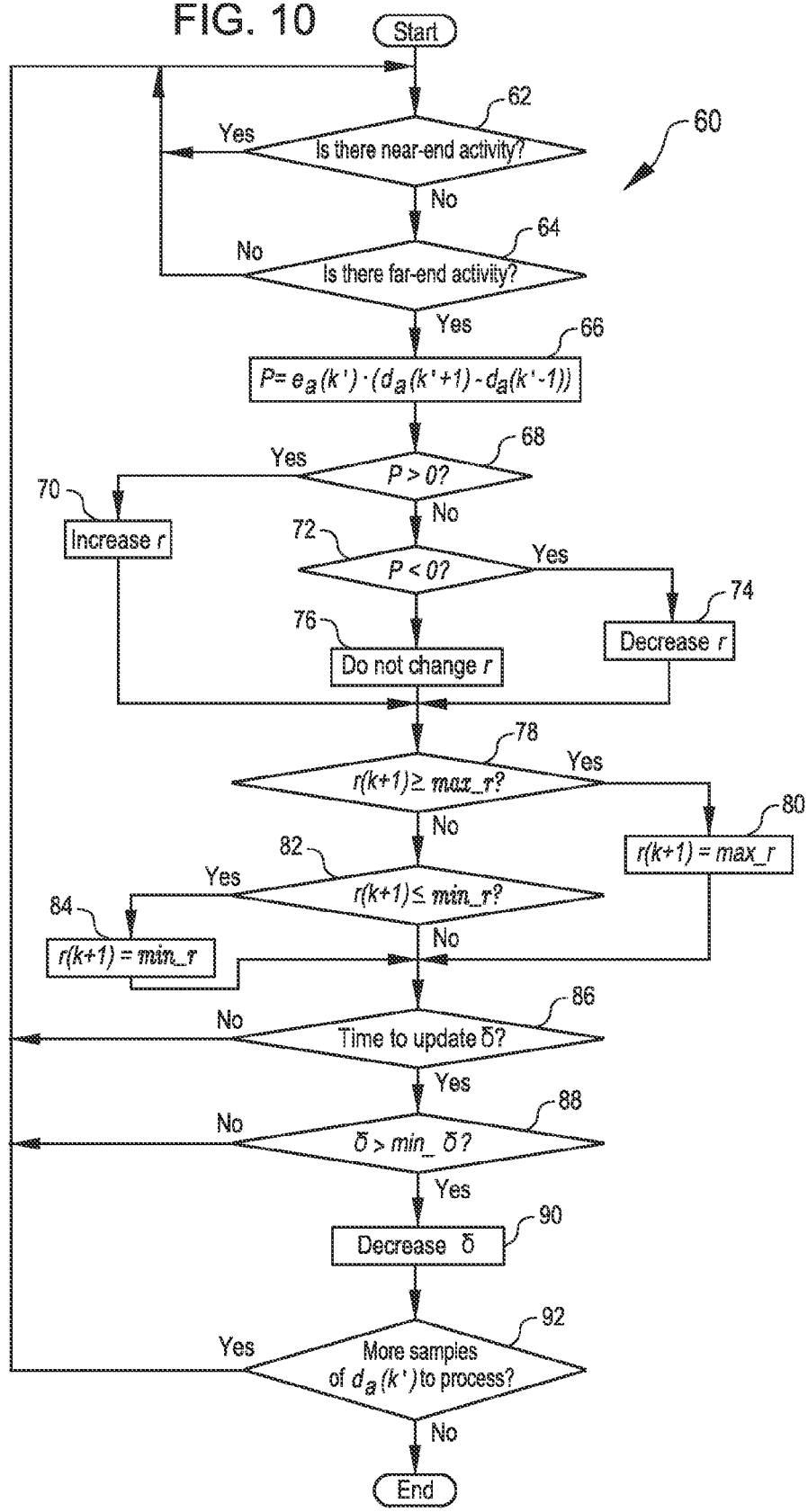

CONVERTING SAMPLES OF A SIGNAL AT A SAMPLE RATE INTO SAMPLES OF ANOTHER SIGNAL AT ANOTHER SAMPLE RATE

SUMMARY

In an embodiment, an apparatus includes a determiner, converter, adapter, and modifier. The determiner is configured to generate a representation of a difference between a first frequency at which a first signal is sampled and a second frequency at which a second signal is sampled, and the converter is configured to generate a second sample of the first signal at a second time in response to the representation and a first sample of the first signal at a first time. The adapter is configured to generate a sample of a modifier signal in response to the second sample of the first signal, and the modifier is configured to generate a modified sample of the second signal in response to a sample of the second signal and the sample of the modifier signal.

For example, such an apparatus may be able to reduce the magnitude of an echo signal in a device having an audio pickup (e.g., a microphone) near an audio output (e.g., a speaker); examples of such devices include a hands-free voice-communication device (e.g., a speaker phone) and a computer with an onboard microphone and speaker. The apparatus may be faster, less complex, and may include fewer components than other echo-reducing or echo-cancelling apparatuses.

BRIEF DESCRIPTION OF THE DRAWINGS

FIG. 1 is a diagram of a hands-free voice-communication system with echo cancellation according to an embodiment.

FIG. 2 is a circuit diagram of one of the voice units of the voice system of FIG. 1 according to an embodiment.

FIG. 3 is a circuit diagram of one of the voice units of the voice system of FIG. 1 according to another embodiment.

FIG. 4 is a flow diagram of an algorithm used by the sample-frequency offset estimator of FIG. 3 for estimating a ratio of sample frequencies according to an embodiment.

FIG. 5a is a plot of a signal of FIG. 3, of samples of the signal, and of an estimated echo component of the signal, according to an embodiment.

FIG. 5b is another plot of the signal of FIG. 5a, of other samples of the signal, and of another estimated echo component of the signal, according to an embodiment.

FIG. 6 is a circuit diagram of the sample-rate converter of FIG. 3 according to an embodiment.

FIG. 7 is a circuit diagram of a filter of the sample-rate converter of FIG. 6 according to an embodiment.

FIG. 8 is a flow diagram of an algorithm for initializing and updating the filter of FIG. 7 and other components of the sample-rate converter of FIG. 6, according to an embodiment.

FIG. 10 is a flow diagram of an algorithm used by the sample-frequency offset estimator of FIG. 9 for estimating a ratio of sample frequencies according to an embodiment.

DETAILED DESCRIPTION

Figure 9:
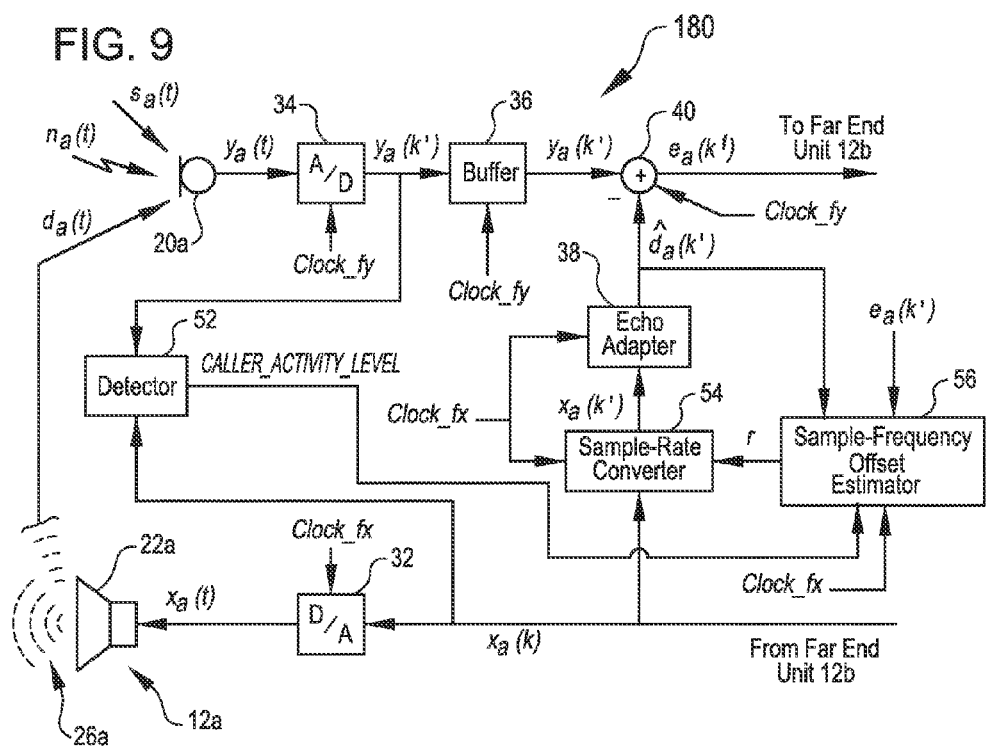
FIG. 9 is a circuit diagram of one of the voice units of the voice system of FIG. 1 according to yet another embodiment.

FIG. 1 is a diagram of a hands-free voice-communication system 10 with echo cancellation according to an embodiment.

The system 10 includes first and second voice units $12_a$ and $12_b$, which allow callers $14_a$ and $14_b$ to communicate with one another via electrical cables $16_a$ and $16_b$ and a network 18, such as, e.g., a local-area network (LAN) and the internet. Alternatively, the cables $16_a$ and $16_b$ may be optical cables, or the cables may be omitted such that the units $12_a$ and $12_b$ wirelessly communicate with the network 18.

The unit $12_a$ includes a microphone $20_a$ for receiving the voice of the caller $14_a$, and includes a speaker $22_a$ for broadcasting the voice of the other caller $14_b$. In detail, while the caller $14_a$ is speaking, he/she generates an acoustic voice signal $24_a$, and the microphone $20_a$ receives a portion of this acoustic voice signal and converts this portion into a corresponding electrical signal. The unit $12_a$ processes this electrical signal, for example, as described below in conjunction with FIGS. 2-10, and transmits this processed electrical signal to the unit $12_b$ over the cable $16_a$, the network 18, and the cable $16_b$. For example, the unit $12_a$ may process the electrical signal by digitizing and formatting it so that it conforms to a communications protocol such as the Voice-Over-Internet Protocol (VOIP). Furthermore, while the caller $14_b$ is speaking, the unit $12_a$ receives and processes an electrical signal from the unit $12_b$, and the speaker $22_a$ converts this processed electrical signal into another acoustic speaker signal $26_a$, which the caller $14_a$ perceives as the voice of the other caller $14_b$.

Likewise, the unit $12_b$ includes a microphone $20_b$ for receiving the voice of the caller $14_b$, and includes a speaker $22_b$ for broadcasting the voice of the other caller $14_a$. In detail, while the caller $14_b$ is speaking, he/she generates an acoustic voice signal $24_b$, and the microphone $20_b$ receives a portion of this acoustic voice signal and converts this portion into a corresponding electrical signal. The unit $12_b$ processes this electrical signal, for example, as described below in conjunction with FIGS. 2-10, and transmits this processed electrical signal to the unit $12_a$ over the cable $16_b$, the network 18, and the cable $16_a$. For example, the unit $12_b$ may process the electrical signal by digitizing and formatting it so that it conforms to a communications protocol such as the Voice-Over-Internet Protocol (VOIP). Furthermore, while the caller $14_a$ is speaking, the unit $12_b$ receives and processes an electrical signal from the unit $12_a$, and the speaker $22_b$ converts this processed electrical signal into another acoustic speaker signal $26_b$, which the caller $14_b$ perceives as the voice of the other caller $14_a$.

Unfortunately, a potential problem with the system 10 is that it may generate an "echo" on either end of the call, and such an echo may reduce the quality of the acoustic voice signal 26 broadcast by either of the speakers 22, even to the point where the words spoken by one caller 14 are unintelligible to the other caller. Furthermore, even if the words spoken by one caller 14 are intelligible to the other caller, the reduced quality of the perceived voice signal may frustrate and fatigue the other caller.

Still referring to FIG. 1, following is an illustrative example of such an echo. Suppose that during a particular period, the caller $14_a$ is speaking into the microphone $20_a$ and the other caller $14_b$ is silent. As described above, the unit $12_a$ transmits an electrical voice signal (corresponding to the voice of the caller $14_a$) to the unit $12_b$, and the speaker $22_b$ broadcasts to the caller $14_b$ the acoustic speaker signal $26_b$, which is the reconstituted voice of the caller $14_a$. But because the microphone $20_b$ is relatively close to the speaker $22_b$, this microphone "picks up" a portion of the acoustic speaker signal $26_b$ from the speaker $22_b$, and converts this portion into an electrical "echo" signal, which the unit $12_b$ processes and transmits to the unit $12_a$. The unit $12_a$ receives and processes this electrical signal, and provides this processed electrical signal to the speaker $22_a$, which converts this processed signal into the acoustic speaker signal $26_2$. Therefore, the caller $14_a$ hears his/her own voice emanating from the speaker $22_a$. That is, the voice of the caller $14_a$ effectively makes a "loop" from the mouth of the caller, to microphone $20_a$, to the speaker $22_b$, to the microphone $22_b$, to the speaker $22_a$, and back to the ear of the caller. And because this "loop" has a signal-propagation delay, the caller $14_a$ hears his/her own voice with a noticeable delay. For example, if the caller $14_a$ utters the word "hello," then he/she may hear his/her own "hello" emanating from the speaker $22_a$ from, e.g., 0.10 to 0.50 seconds after he/she uttered "hello;" hence the term "echo."

Fortunately, the voice units $12_a$ and $12_b$ include echo-cancellation circuitry to reduce or eliminate such an echo, and, therefore, to improve the quality of the acoustic voice signals 26 emanating from the speakers 22. Embodiments of echo-cancellation circuits and techniques are described below in conjunction with FIGS. 2-10.

Still referring to FIG. 1, alternate embodiments of the system 10 are contemplated. For example, the units $12_a$ and $12_b$ may each be, or may each include, a respective computer that has a built-in, or an external, microphone and speaker to allow voice-over-internet (VOI) calls using internet applications such as Skype. Or, the system 10 may be any type of system, such as a music sound system, that includes a speaker and a microphone that can pick up an acoustic signal that the speaker broadcasts; in a music sound system, the looped signal may be called a "feedback" signal instead of an "echo" signal.

FIG. 2 is diagram of a circuit 30 of the voice unit $12_a$ of FIG. 1, it being understood that the voice unit $12_b$ may include a similar circuit.

When describing the circuit 30 of the voice unit $12_a$, one may refer to the unit $12_a$ as the "near-end" unit, and he/she may refer to the unit $12_b$ as the "far end" unit; conversely, when describing the circuit of the voice unit $12_b$, one may refer to the unit $12_b$ as the "near-end" unit, and he/she may refer to the unit $12_a$ as the "far end" unit.

Still referring to FIG. 2, the near-end unit $12_a$ receives from the far-end unit $12_b$ a digital electronic signal $x_a(k)$, which is formed by a stream of samples that occur at a sample rate, i.e., a sample frequency, $f_x$, and in which "k" is the sample index. The electronic signal $x_a(k)$ represents the combined acoustic signal received by the microphone $20_b$ of the voice unit $12_b$ of FIG. 1, where this combined acoustic signal may be a combination of one or more of the following components: a portion $s_b(t)$ of the acoustic voice signal $24_b$ (FIG. 1) received by the microphone $20_b$ (FIG. 1), a portion $d_b(t)$ of the acoustic speaker signal $26_b$ (FIG. 1) received by the microphone $20_b$ (this portion $d_b(t)$ may be hereinafter referred to as the echo portion and may have been reduced or cancelled by the far-end unit $12_b$), any other acoustic signal (including acoustic noise $n_b(t)$) that the microphone $20_b$ picks up, and any noise (acoustic or non-acoustic) that the microphone $20_b$ may generate.

Similarly, the near-end unit $12_a$ transmits to the far-end unit $12_b$ an echo-cancelled digital signal $e_a(k')$, which is formed by a stream of samples that occur at a sample rate $f_y$, and in which "k'" is the sample index. Ideally, the signal $e_a(k')$ represents a modification of the acoustic signal received by the microphone $20_a$, where this modified acoustic signal lacks any echo component $d_a(t)$ of the acoustic speaker signal $26_a$ from the speaker $22_a$. Ideally, by removing from $e_a(k)$ all of the echo component $d_a(t)$ of the acoustic speaker signal $26_a$, the echo "loop" described above in conjunction with FIG. 1 is broken such that the far-end caller $14_b$ (FIG. 1) will not hear an echo, i.e., will not hear his/her own voice emanating from the speaker $22_b$ (FIG. 1). But as discussed below, a problem with the circuit 30 is that it may be able to achieve complete echo cancellation only if $f_x = f_y$.

Still referring to FIG. 2, the circuit 30 of the voice unit $12_a$ includes a digital-to-analog (D/A) converter 32, which drives the speaker $22_a$, an analog-to-digital (A/D) converter 34, which receives an analog signal $y_a(t)$ from the microphone $20_a$, a buffer 36, an echo adapter 38, and a combiner (an adder in the described embodiment) 40.

The D/A converter 32 converts the digital electronic signal $x_a(k)$ into an analog speaker-drive signal $x_a(t)$ at approximately the frequency $f_x$, which is the frequency at which the samples occur in the signal $x_a(k)$. The circuit 30 may derive the clock signal CLOCK_$f_x$ for the D/A converter 32 from the signal $x_a(k)$ in a conventional manner so that the frequency of CLOCK_$f_x$ accurately tracks the sample frequency $f_x$.

The A/D converter 32 converts the analog electronic signal $y_a(t)$ from the microphone $20_a$ into a digital electronic signal $y_a(k')$ at the sample frequency $f_y$ in response to a clock signal CLOCK_$f_y$. As discussed above, while the speaker $22_a$ is generating the acoustic speaker signal $26_a$, the signal $y_a(k')$ typically does include an echo component $d_a(k')$ that corresponds to the echo component $d_a(t)$ of the acoustic speaker signal $26_a$ as discussed below.

The buffer 36 buffers the samples of the signal $y_a(k')$, and provides these buffered samples to the combiner 40 at the sample frequency $f_y$.

The echo adapter 38 generates from the digital electronic signal $x_a(k)$ a digital echo-cancellation signal (more generally a modifier signal) $\hat{d}_a(k)$, which is an estimate of the echo component $d_a(k')$ of $y_a(k')$, where $d_a(k')$ results from the echo component $d_a(t)$ of the acoustic speaker signal $26_a$; that is $d_a(k')$ is the result of $d_a(t)$ effectively propagating through the microphone $20_a$, the A/D converter 34, and the buffer 36. For example, the adapter 38 may be a conventional finite-impulse-response (FIR) filter with tap weights $w_a(k)$. Because embodiments of the adapter 38 are known, the details of the adapter are not described in detail.

And the combiner 40 generates the echo-cancelled signal (more generally the modified signal) $e_a(k')$ in response to the signals $y_a(k')$ and $\hat{d}_a(k)$. For example, as shown in FIG. 2, the combiner 40 may subtract $\hat{d}_a(k)$ from $y_a(k')$ to generate $e_a(k')$. That is, the combiner 40 subtracts from the signal $y_a(k')$ the estimate $\hat{d}_a(k)$ of the echo component $d_a(k')$ of $y_a(k')$ to generate the echo-cancelled signal $e_a(k')$. Ideally, the estimate $\hat{d}_a(k)$ equals the echo component $d_a(k')$ of $y_a(k')$ such that $e_a(k')$ includes no echo component; but even if the estimate $\hat{d}_a(k)$ is not equal to the echo component $d_a(k')$, the magnitude of the echo component in $e_a(k')$ may be significantly reduced as compared to the magnitude of the echo component $d_a(k')$ in $y_a(k')$.

Still referring to FIG. 2, operation of the voice unit $12_a$ is described according to an embodiment.

The echo adapter 38 converts samples of the digital signal $x_a(k)$ from the far-end voice unit $12_b$ (FIG. 1) into corresponding samples of the estimated echo component $\hat{d}(k)$ at the sample frequency $f_x$. The echo adapter 38 may also add a delay to the estimated component $\hat{d}_a(k)$ to compensate for the combined delay that the D/A converter 32, the speaker $22_a$, the microphone $20_a$, the A/D converter 34, and the buffer 36 effectively impart to the echo component $d_a(t)$.

The D/A converter 32 converts the samples of the digital signal $x_a(k)$ into the analog speaker-drive signal $x_a(t)$ at the sample frequency $f_x$.

The speaker $22_a$ converts the analog signal $x_a(t)$ into the acoustic speaker signal $26_a$.

The microphone $20_a$ picks up the analog echo component $d_a(t)$ from the acoustic speaker signal $26_a$ (that is, the portion of the acoustic speaker signal $26_a$ that the microphone $20_a$ picks up is the analog echo component $d_a(t)$), a voice component $s_a(t)$ from the acoustic voice signal $24_a$ generated by the caller $14_a$ (FIG. 1) speaking, and a noise component $n_a(t)$, and converts these components (or at least those of these components that are present) into the analog microphone signal $y_a(t)$.

The A/D converter 34 converts the analog microphone signal $y_a(t)$ into the digital microphone signal $y_a(k')$ at the sampling frequency $f_y$, and the buffer 36 buffers the samples of $y_a(k')$.

The combiner 40 combines the digital microphone signal $y_a(k')$ with the digital echo-estimation component $\hat{d}_a(k)$ to generate the echo-cancelled signal $e_a(k')$. As discussed above, if the magnitudes of the samples of $\hat{d}_a(k)$ equal the magnitudes of the components $d_a(k')$ of the corresponding samples of $y_a(k')$, then the echo component $d_a(k')$ is completely removed from the signal $e_a(k')$ such that the caller $14_b$ (FIG. 1) perceives no echo of his/her own voice at the far-end voice unit $12_b$. And if the echo adapter is designed to include in the echo-estimation component $\hat{d}_a(k)$ an estimate $\hat{n}_a(k')$ of the noise $n_a(t)$, then the combiner 40 may also cancel noise from the signal $e_a(k')$.

And the voice unit $12_a$ provides the echo-cancelled signal $e_a(k')$ to the far-end unit $12_a$ via the cables $16_a$ and $16_b$ and the network 18 (FIG. 1).

But if the samples k' do not occur at the same frequency as the samples k (i.e., if $f_x \neq f_y$), then the samples of $\hat{d}_a(k)$ may not be temporally aligned with the echo components $d_a(k')$; therefore, the level of echo cancellation (and noise cancellation if applicable) provided by $\hat{d}_a(k)$ when $f_x \neq f_y$ may be reduced as compared to the level of echo cancellation when $f_x = f_y$.

Although the D/A converter 32 and the ND converter 34 may be disposed on the same integrated circuit, and their clocks CLOCK_$f_x$ and CLOCK_$f_y$ may be generated from the same master clock, it has been found that the frequencies $f_x$ and $f_y$ of these clocks may be slightly different due to, e.g., clock skew and parasitic capacitances and inductances. For example, a sample-frequency ratio r is given by the following equation:

$$r = f_x / f_y \quad (1)$$

Ideally, r would equal one, but in actuality, it has been found that r may vary approximately between, e.g., 0.9999 and 1.0001, in some applications.

From equation (1) one may derive the following equation:

$$rT_x = T_y \quad (2)$$

where $T_x = 1/f_x$ and $T_y = 1/f_y$.

From equation (2), one may derive the following equations:

$$x_a(k) = x_{ac}(t = kT_x) \quad (3)$$

$$y_a(k') = y_a(t = k'T_y) \quad (4)$$

$$x_a(k') = x_{ac}(t = rkT_x) = x_{ac}(t = (f_x/f_y)kT_x) = x_{ac}(t = (T_y/T_x)kT_x) = x_{ac}(t = kT_y) = x_a(rk) \quad (5)$$

where $x_{ac}$ is an actual, or theoretical, analog signal that is sampled at the frequency $f_x$ to generate the digital signal $x_a(k)$. Equation (5) indicates that one may temporally align the samples of $y_a(k')$ and samples of $x_{ac}(t)$, and thus align the samples of $y_a(k')$ and $\hat{d}_a$, if he/she generates samples k' of $x_{ac}(t)$ according to the following equation:

$$x_a(k') = x_{ac}(rkT_x) = x_a(rk) \quad (6)$$

And if $r=1$, then equation (6) reduces to:

$$x_a(k') = x_a(k) \quad (7)$$

as expected.

But because the signal $x_{ac}(t)$ may be unavailable at the voice unit $12_a$ (e.g., because $x_a(k)$ is effectively generated from $x_{ac}(t)$ by the voice unit $12_b$), another way to generate $x_a(k')$ is to interpolate $x_a(k')$ from $x_a(k)$ by interpolating samples k' at sample times $t_{k'}$ from the samples k at sample times $t_k$.

A technique for interpolating $x_a(k')$ from $x_a(k)$ per equations (6) and (7) is to use circuitry that implements a Least-Mean-Square (LMS) approach to estimate the ratio r, and to up sample $x_a(k)$, to convert the up-sampled $x_a(k)$ into $\hat{x}_{ac}(t)$, which is an estimate of $x_{ac}(t)$, and to sample $\hat{x}_{ac}(t)$ at sample times $rkT_x$ to generate $x_a(k')$.

But such circuitry is often relatively complex, includes a relatively large number of components, occupies a relatively large area, and consumes a relatively large amount of power.

FIG. 3 is diagram of a circuit 50 of the voice unit $12_a$ of FIG. 1, where the circuit 50 is able to interpolate samples $x_a(k')$ from samples $x_a(k)$ with relatively little additional complexity, relatively few additional components, and relatively little additional power consumption as compared to the circuit 30 of FIG. 2. Furthermore, like labels are used to reference components common to FIGS. 2 and 3.

The circuit 50 is similar to the circuit 30 of FIG. 2 except that the circuit 50 also includes a caller-activity detector 52, a sample-rate converter 54, and a sample-frequency-ratio estimator 56.

The detector 52 receives the signals $x_a(k)$ and $y_a(k')$, detects whether the acoustic speaker signal $26_a$ from the speaker $22_a$ is present (i.e., nonzero) and whether the acoustic voice signal $24_a$ from the caller $14_a$ (FIG. 1) is present, and generates a signal CALLER_ACTIVITY_LEVEL that indicates this information; for example, the detector may generate CALLER_ACTIVITY_LEVEL having a first logic level if only the acoustic speaker signal $26_a$ from the speaker $22_a$ is present, and having a second logic level otherwise. Furthermore, the detector 52 may be asynchronous, or may be clocked by either of the clock signals CLOCK_$f_y$ and CLOCK_$f_x$. Because the detector 52 may be constituted by conventional circuitry, further details of the detector are omitted.

The sample-rate converter 54, which is further described below in conjunction with FIGS. 6-8, receives the clock signal CLOCK_$f_x$ and converts the samples of $x_a(k)$ into samples of $x_a(k')$.

And the sample-frequency-ratio estimator 56, which is further described below in conjunction with FIG. 4, receives the clock signal CLOCK_$f_x$, the signal CALLER_ACTIVITY_LEVEL, and the signals $y_a(k')$ and $e_a(k')$, and determines the ratio $r = f_x/f_y$ in response to these signals. For example, as discussed below, the estimator 56 updates r only when CALLER_ACTIVITY_LEVEL has a logic level that indicates that only the acoustic speaker signal $26_a$ from the speaker $22_a$ is present.

In operation, the detector 52 determines whether the acoustic signals $24_a$ and $26_a$ are present, and provides this information to the sample-frequency-ratio estimator 56 via the signal CALLER_ACTIVITY_LEVEL.

The sample-rate converter 54 converts the samples of $x_a(k)$ into respective samples of $x_a(k')$ in response to the value for r provided by the sample-frequency-ratio estimator 56, and the echo adapter 38 generates the estimated echo signal $\hat{d}_a(k')$ (which also may include an estimate of the noise per above) in response to $x_a(k')$, such that samples of $\hat{d}_a(k')$, $y_a(k')$, and $e_a(k')$ are approximately temporally aligned.

The sample-frequency-ratio estimator 56 updates r every cycle of CLOCK_$f_x$ if the detector 52 indicates that the acoustic speaker signal $26_a$ is present and that the acoustic voice signal $24_a$ (FIG. 1) is not present; otherwise, the estimator 56 leaves r unchanged. That is, as discussed below in conjunction with FIG. 4, the estimator 56 only updates r when the far-end caller $14_b$ (FIG. 1) is speaking and the near-end caller $14_a$ (FIG. 1) is not speaking; but if both callers are speaking simultaneously, or if neither caller is speaking, then the estimator does not update r.

Still referring to FIG. 3, alternate embodiments of the circuit 50 are contemplated. For example, the circuit 50 may be adapted for a system, such as a music system with a speaker and microphone in close proximity, other than the voice system 10 of FIG. 1. Furthermore, the components of the circuit 50 may be implemented in hardware, software, or firmware, or a combination of two or more of hardware, software, or firmware. When implemented in software, the function of a component may be performed by a computing apparatus, such as a microprocessor or microcontroller, executing instructions. Moreover, although described as determining a ratio r of sampling frequencies, the sample-frequency-ratio estimator 56 may determine another quantity that is indicative of a difference between, or differences among, multiple sampling frequencies.

FIG. 4 is a flow diagram 60 of an algorithm that the sample-frequency-ratio estimator 56 of FIG. 3 may implement to determine and track the value of the frequency ratio r, according to an embodiment.

Referring to FIGS. 3 and 4, at an initial step 62 (FIG. 4), the estimator 56 (FIG. 3) determines, in response to the signal CALLER_ACTIVITY_LEVEL received from the detector 52 (FIG. 3), whether there is any near-end activity, i.e., whether the near-end caller $14_a$ (FIG. 1) is speaking such that the component $s_a(t)$ (FIG. 3) of the acoustic voice signal $24_a$ (FIG. 1) has a non-zero value. If the estimator 56 determines that there is near-end activity, then it repeats step 62, and continues to do so until such time as there is no near-end activity. But if the estimator 56 determines that there is no near-end activity, then it proceeds to step 64.

At step 64, the estimator 56 determines, in response to the signal CALLER_ACTIVITY_LEVEL received from the detector 52, whether there is any far-end activity, i.e., whether the far-end caller $14_b$ (FIG. 1) is speaking such that the echo component $d_a(t)$ of the acoustic speaker signal $26_a$ has a non-zero value. If the estimator 56 determines that there is far-end activity, then it proceeds to step 66. But if the estimator 56 determines that there is no far-end activity, then it returns to step 62.

At step 66, the estimator 56 (FIG. 3) determines a product P according to the following equation:

$$P = e_a(k') \cdot (y_a(k'+1) - y_a(k'-1)) \quad (8)$$

where the sign ("+" or "−") of P indicates whether the frequency ratio $r = f_x/f_y$ is too high or too low.

Referring to FIGS. 5a and 5b, how the sign of P indicates whether r is too high or too low is described.

FIG. 5a is a plot of the signal $y_a(t)$, and of the samples $y_a(k'+1)$, $y_a(k'-1)$, and $y_a(k')$ of $y_a(t)$, and a sample of $\hat{d}_a(k')$, of FIG. 3 according to an embodiment.

Because the estimator 56 updates r only if there is far-end activity but no near-end activity, and assuming that the noise component $n_a(t)$ received by the microphone $20_a$ (FIG. 3) is negligible, then, when r is eligible to be updated, the following expression is true:

$$y_a(t) \approx d_a(t) \quad (9)$$

Therefore, assuming that the echo adapter 58 accurately estimates the estimated echo component $\hat{d}_a(k')$ of $y_a(k')$, and if the value of r is accurate, then the following expressions are also true:

$$\hat{d}_a(k') \approx y_a(k'), \text{ and} \quad (10)$$

$$e_a(k') \approx 0 \quad (11)$$

But if $\hat{d}_a(k') > y_a(k')$ as shown in FIG. 5a, then this means that $\hat{d}_a(k')$ lags $y_a(k')$, and, therefore, that r is too small. So in this condition, $e_a(k')$ has a negative value, as does the difference $y_a(k'+1) - y_a(k'-1)$, such that P is positive (i.e., per equation (8), a negative value times a negative value equals a positive value). Furthermore, one can show that whenever $\hat{d}_a(k')$ lags $y_a(k')$, P is positive. Therefore, a positive value for P indicates that value of r is too small and needs to be increased.

FIG. 5b is a plot of the signal $y_a(t)$, of the samples $y_a(k'+1)$, $y_a(k'-1)$, and $y_a(k')$ of $y_a(t)$, and a sample of $\hat{d}_a(k')$, of FIG. 3, according to another embodiment.

Because, in this example, $\hat{d}_a(k') < y_a(k')$, this means that $\hat{d}_a(k')$ leads $y_a(k')$, and, therefore, that the value of r is too large. So in this condition, $e_a(k')$ has a positive value, but the difference $y_a(k'+1) - y_a(k'-1)$ has a negative value, such that P is negative. Furthermore, one can show that whenever $\hat{d}_a(k')$ leads $y_a(k')$, P is negative. Therefore, a negative value for P indicates that value of r is too large and needs to be decreased.

Referring again to FIG. 4, at step 68, the estimator 56 (FIG. 3) determines whether P is greater than zero, i.e., whether P is positive. If P is positive, then the estimator 56 proceeds to step 70 to increase r. But if P is not positive, then the estimator proceeds to step 72.

At step 70, the estimator 56 increases r in response to P being positive. For example, the estimator 56 may increase r by incrementing r by an arbitrary constant δ, which, in an embodiment, has an initial value of $1 \times 10^{-8}$, according to the following equation:

$$r(k+1) = r(k) + \delta \quad (12)$$

After increasing r, the estimator 56 proceeds to step 78.

At step 72, because P is not positive, the estimator 56 determines whether P is less than zero, i.e., whether P is negative. If P is negative, then the estimator 56 proceeds to step 74 to decrease r. But if P is not negative (i.e., P=0), then the estimator proceeds to step 76.

At step 74, the estimator 56 decreases r. For example, the estimator 56 may decrease r by decrementing r by δ according to the following equation:

$$r(k+1) = r(k) - \delta \quad (13)$$

After decreasing r, the estimator 56 proceeds to step 78.

At step 76, because P is neither positive or negative, i.e., P=0, the estimator 56 maintains r at its present value according to the following equation:

$$r(k+1) = r(k) \quad (14)$$

Next, at step 78, the estimator 56 determines whether the current value of r, r(k+1), is greater than or equal to a maximum value max_r, which may be any value that is suitable for the application. For example, max_r may approximately equal 1.0001. If r(k+1) is greater than or equal to max_r, then the estimator 56 proceeds to step 80 to limit r. But if r(k+1) is not greater than or equal to max_r, then the estimator 56 proceeds to step 82.

At step 80, the estimator 56 sets r(k+1)=max_r, and then proceeds to step 86. That is, the estimator 56 limits the current value of r to be no higher than max_r.

At step 82, the estimator 56 determines whether r(k+1) is less than or equal to a minimum value min_r, which may be any value that is suitable for the application. For example, min_r may be approximately equal 0.9999. If r(k+1) is less than or equal to min_r, then the estimator 56 proceeds to step 84 to limit r. But if r(k+1) is not less than or equal to min_r, then the estimator 56 proceeds to step 86.

At step 84, the estimator 56 sets r(k+1)=min_r, and then proceeds to step 86. That is, the estimator 56 limits the current value of r to be no lower than min_r.

Next, at steps 86 and 88, the estimator 56 determines if it is time to update δ, and if so, determines if δ is to be updated. For example, the estimator 56 may reduce the constant δ every U samples k as long as δ is greater than a minimum value min_δ. U and δ may have any values, such as approximately 50,000 and $1 \times 10^{-10}$, respectively, that are suitable for the application. Periodically reducing δ may allow the estimator 56 to converge to a relatively precise value of r.

More specifically, at step 86, the estimator 56 determines whether it is time to update δ. The estimator 56 may do this by determining that it is time to update δ if Mod(k,U)=0. Therefore, if Mod(k,U)=0, then the estimator 56 proceeds to step 88. But if Mod(k,U)≠0, then the estimator returns to step 62 without modifying δ.

At step 88, the estimator 56 determines whether δ>min_δ. If δ>min_δ, then the estimator 56 proceeds to step 90. But if δ≤min_δ, then the estimator 56 returns to step 62 without modifying δ.

At step 90, the estimator 56 updates δ. For example, the estimator may decreases δ, and may do so by setting δ=δ/10.

Then, at step 92, the estimator 56 (FIG. 3) determines whether there are more samples of $y_a(k')$ to process. If there are more samples, then the estimator 56 (FIG. 3) returns to step 62. If there are no more samples, then the estimator 56 halts estimation of r.

Therefore, in summary, the estimator 56 updates r only when there is far-end activity and no near-end activity, and does so in a way that causes r to converge to an accurate value over a number of samples k. Furthermore, the embodiment of the r-updating algorithm represented by the flow diagram 60 may be suited for a voice unit 12 where the sample frequencies $f_x$ and $f_y$ are relatively stable, or vary relatively slowly over time.

Still referring to FIG. 4, alternate embodiments of the algorithm represented by the flow diagram 60 are contemplated. For example, some of the described steps may be removed or modified, and steps other than those steps that are disclosed may be included in the algorithm.

FIG. 6 is a diagram of the sample-rate converter 54 of FIG. 3 according to an embodiment.

The sample-rate converter 54 includes an input node 100 for receiving samples of the signal $x_a(k)$, an output node 102 for providing samples of the signal $x_a(k')$, two conversion paths $104_a$ and $104_b$, and a switch 106 for coupling a selected one of the paths to the output node in response to a control signal PATH_SELECT. The output node 102 is coupled to an input node of the echo adapter 38 of FIG. 3.

The conversion path $104_a$ includes a programmable delay circuit $108_a$ and a filter, such as a fractional-delay IIR filter, $110_a$ for interpolating samples of $x_a(k)$ from corresponding samples of $x_a(k)$. The filter $110_a$ may be clocked by the signal CLOCK_$f_x$. An embodiment of the filter $110_a$ is further described below in conjunction with FIG. 7.

Similarly, the conversion path $104_b$ includes a programmable delay circuit $108_b$ and a filter, such as a fractional-delay IIR filter, $110_b$ for interpolating samples of $x_a(k')$ from corresponding samples of $x_a(k)$. The filter $110_b$ may be clocked by the signal CLOCK_$f_x$. An embodiment of the filter $110_b$ is further described below in conjunction with FIG. 7.

In operation, during first periods that each may be, for example, 500 samples k long, the control signal PATH_SELECT has a value, e.g., a logic 0, that causes the switch 106 to couple the conversion path $104_a$ to the output node 102.

Therefore, during these first periods, the conversion path $104_a$ generates samples of $x_a(k')$ while the sample-rate converter 54 updates one or more parameters of the conversion path $104_b$. Such parameters, and the updating thereof, are further described below in conjunction with FIGS. 7 and 8.

Similarly, during second periods that each may be, for example, 500 samples k long, and that alternate with the first periods, the control signal PATH_SELECT has a value, e.g., a logic 1, that causes the switch 106 to couple the conversion path $104_b$ to the output node 102.

Therefore, during these second periods, the conversion path $104_b$ generates samples of $x_a(k')$ while the sample-rate converter 54 updates one or more parameters of the conversion path $104_a$. Such parameters, and the updating thereof, are further described below in conjunction with FIGS. 7 and 8.

Consequently, by including two conversion paths $104_a$ and $104_b$, the sample-rate converter 54 can update one of the paths while the other path is generating samples of $x_a(k')$ such that the periodic updating of the paths introduces little or no delay to the generating of $x_a(k')$.

Still referring to FIG. 6, alternate embodiments of the sample-rate converter 54 are contemplated. For example, the converter 54 may include fewer or more than two conversion paths 104. Furthermore, the filters $110_a$ and $110_b$ may be replaced with interpolation circuits other than filters. Moreover, one or more of the filters 110 and the switch 106 may be implemented in hardware, software, or firmware, or a combination of two or more of hardware, software, and firmware.

FIG. 7 is a diagram of the filter $110_a$ of FIG. 6 according to an embodiment, it being understood that the filter $110_b$ of FIG. 6 may be similar. A filter similar to the filter $110_a$ is described in Olkkonen et al., "Fractional Delay Filter Based on the B-Spline Transform," IEEE Signal Processing Letters, Vol. 14, No. 2, February 2007, pp. 97-100, which is incorporated by reference.

The filter $110_a$ includes an input node 120 for receiving delayed samples of $x_a(k)$ from the delay circuit $108_a$, an output node 122 for providing samples of $x_a(k)$, summers $124_1$-$124_n$, one-sample delay circuits $126_2$-$126_n$, first multipliers $128_2$-$128_n$ having respective first constant multiplying coefficients $-a_2$--$a_n$, and second multipliers $130_1$-$130_n$ having respective second constant multiplying coefficients $b_1$-$b_n$; n can be any value that is suitable for the interpolation accuracy specified for a particular application.

In operation, the sample-converter 54 (FIG. 3) provides initial values for the outputs $Z_2(k)$-$Z_n(k)$ of the summers $124_2$-$124_n$, and provides values for the coefficients $-a_2$--$a_n$ and $b_1$-$b_n$, in a manner that is further described below in conjunction with FIG. 8. The sample-rate converter may store these initial values and coefficient values in a memory that is internal or external to the sample-rate converter 54.

Each summer $124_2$-$124_n$ receives on a first input node $132_2$-$132_n$ a respective value $-a_2 \cdot x_a(k')$--$a_n \cdot x_a(k')$, receives on a second input node $134_2$-$134_n$ a respective value $b_2 \cdot x_a(k)$-$b_n \cdot x_a(k)$, receives (except for the summer $124_n$) on a third input node $136_2$-$136_{n-1}$ the output of a respective delay circuit $126_3$-$126_n$, and adds these received values together to generate the respective summer output $Z_2(k)$-$Z_n(k)$.

And the summer $124_1$ receives on a first input node $134_1$ a value $b_1 \cdot x_a(k)$, receives on a second input node $136_1$ the output of the delay circuit $126_2$, and adds these received values together to generate samples of $x_a(k')$.

Still referring to FIG. 7, alternate embodiments of the filter $110_a$ are contemplated. For example, the filter $110_a$ may have any other structure or function that is suitable to generate samples of $x_a(k')$ from samples of $x_a(k)$. Furthermore, any of the components of the filter $110_a$ may be implemented in hardware, software, firmware, or a combination of two or more of hardware, software, and firmware; and the function of any component implemented in software may be performed by a computing apparatus, such as a microcontroller or microprocessor, that executes instructions.

FIG. 8 is a flow diagram 150 of an algorithm that the sample-rate converter 54 of FIG. 3 may implement to periodically update the parameters of the filters $110_a$ and $110_b$ of FIGS. 6 and 7 according to an embodiment.

Referring to FIGS. 3, and 6-8, at step 152 of the flow diagram 150 (FIG. 8), the sample-rate converter 54 (FIG. 3) determines the current time instant THIS_INSTANT in response to the sample-frequency ratio r from the sampling-frequency-ratio estimator 56 (FIG. 3). For example, the converter 54 may determine THIS_INSTANT according to the following equation (which assumes that the initial value of k=0):

$$\text{THIS\_INSTANT} = r(k) \cdot (k-1) \quad (15)$$

For example, if r(k)=1.000001 and k=678, then THIS_INSTANT would equal 677.000677. Therefore, the filters $110_a$ and $110_b$ use THIS_INSTANT to effectively translate the samples k of $x_a(k)$ taken at sample times $t_k$ into samples k' of $x_a(k')$ taken at sample times $t_{k'}$.

Then, at step 154, the converter 54 determines whether it is time to update either of the filters $110_a$ and $110_b$. For example, the converter 54 may make this determination by solving the following expressions:

$$\text{Mod}(k, K1) \quad (16)$$

$$\text{Mod}(k, K2) \quad (17)$$

where it is time to update the filter $110_a$ if Mod(k, K1)=0 and Mod(k, K2)≠0, and where it is time to update the filter $110_b$ if Mod(k, K1)=Mod(k, K2)=0. For example, if K1=500 and K2=1000, then the converter 54 updates the filter $110_a$, and activates the filter $110_b$ to generate the samples of $x_a(k')$ via the switch 106 (FIG. 6), at sample times k=500, 1500, 2500, ..., 500+q·1000, where q is an integer; similarly, the converter updates the filter $110_b$, and activates the filter $110_a$ to generate the samples of $x_a(k')$ via the switch 106, at sample times k=1000, 2000, 3000, ..., q·1000. That is, the converter 54 is updating one of the filters every 500 samples k. By updating one filter while the other filter is generating $x_a(k')$, the converter 54 reduces or eliminates delays in generating $x_a(k')$ due to the time needed to update a filter.

Still referring to step 154, if the converter 54 determines that t is time to update one of the filters $110_a$ and $110_b$, then the converter proceeds to step 156; otherwise, the converter 54 returns to step 152.

At step 156, the converter 54 determines a DELAY between the previously determined current time instant THIS_INSTANT and the previous sample time k−1, for example, according to the following equation:

$$\text{DELAY} = (k-1) - \text{THIS\_INSTANT} \quad 18)$$

Next, at step 158, the converter 54 determines a fractional portion FRACTIONAL_DELAY of the DELAY, for example, according to the following equation:

$$\text{FRACTIONAL\_DELAY} = \text{DELAY} - \text{floor}(\text{DELAY}) \quad (19)$$

where the operator floor(arg) rounds its argument (here DELAY) to the greatest integer that is less than the argument. For example, floor(2.3)=2, and floor(−2.3)=3.

Then, at step 160, the converter 54 determines an integer portion INTEGER_DELAY of the DELAY, for example, according to the following equation:

$$\text{INTEGER\_DELAY} = \text{DELAY} - \text{FRACTIONAL\_DELAY} \quad (20)$$

Next, at step 162, the converter 54 determines whether it is time to update the filter $110_a$ or the filter $110_b$ per expressions (16) and (17) as described above. If it is time to update the filter $110_a$, then the converter 54 proceeds to steps 164 and 166; but if it is time to update the filter $110_b$, then the converter proceeds to steps 168 and 170.

At step 164, the converter 54, generates a value (e.g., logic 1) of PATH_SELECT (FIG. 6) that causes the switch 106 to couple the filter $110_b$ to the output node 102 and to uncouple the filter $110_a$ from the output node. Therefore, while the converter 54 is updating the filter $110_a$, the filter $110_b$ generates the samples of $x_a(k')$.

Next, at step 166, the converter 54 updates the delay of the delay block $108_a$, and updates the coefficients and sets the initial conditions of the filter $110_a$.

For example, the converter 54 may update the delay BLOCK_DELAY of the block $108_a$ according to the following equation:

$$\text{BLOCK\_DELAY} = \text{INTEGER\_DELAY} - 2 \quad (21)$$

That is, in terms of a z transform, BLOCK_DELAY= $z^{-|\text{INTEGER\_DELAY}-2|}$.

To determine the coefficients $-a_2, -a_3, \ldots, -a_n = \vec{a}$ and $b_1, b_2, b_3, \ldots, b_n = \vec{b}$, the converter 54 may first determine a value C according to the following equation:

$$C = \text{floor}((2 + \text{FRACTIONAL\_DELAY}) \cdot 100) \quad (22)$$

Then, the converter 54 may determine the coefficients $\vec{a}$ and $\vec{b}$ according to the following equation:

$$[\vec{a}, \vec{b}] = \text{compute\_bspline}(C, M, p) \quad (23)$$

where the operator compute_bspline(arg) is described in, e.g., Table I, equation (18), and the Appendix of Olkkonen et al., "Fractional Delay Filter Based on the B-Spline Transform," IEEE Signal Processing Letters, Vol. 14, No. 2, February 2007, pp. 97-100, which was previously incorporated by reference, and M and p may be any suitable values such as 100 and 4, respectively (note that p is distinguished from the product P, which is described above in conjunction with FIG. 4).

Next, the converter 54 may determine the initial values for the outputs $z_2(k), z_3(k), \ldots, z_n(k) = \vec{z}$ of the summers $124_2$-$124_n$ according to the following equation:

$$\vec{z} = \text{zeros}(1, (\text{length}(\vec{a}) - 1)) \quad (24)$$

where the operator length(arg) returns the length of its vector argument (here the vector $\vec{a}$ having a length of n−1), and the operator zeros(arg) returns a matrix of all zeros having the dimensions of its argument (here a 1×length(arg)−1 row vector).

Still referring to step 166, the converter 54 may store the determined values for $\vec{a}$ and $\vec{b}$ for the filter $110_a$ in a memory on board, or external to, the converter. Furthermore, the converter 54 may effectively store the determined value for BLOCK-DELAY in the configuration of the delay block $108_a$ of FIG. 6, and may effectively store the elements of z in the summers $124_2$-$124_n$ (FIG. 7) of the filter $110_a$ as the initial outputs of the summers.

Conversely, if, at step 162, the converter 54 determines that it is time to update the filter $110_b$, then, at step 168, the converter 54 generates a value (e.g., logic 0) of PATH_SELECT (FIG. 6) that causes the switch 106 to couple the filter $110_a$ to the output node 102 and to uncouple the filter $110_b$ from the output node. Therefore, while the converter 54 is updating the filter $110_b$, the filter $110_a$ generates the samples of $x_a(k')$.

Then, at step 170, the converter 54 updates the delay of the delay block $108_b$, and updates the coefficients and sets the initial conditions of the filter $110_b$.

For example, the converter 54 may update the delay BLOCK_DELAY of the block $108_b$ according to equation (21) above.

To determine the coefficients $-a_2, -a_3, \ldots, -a_n = \vec{a}$ and $b_1, b_2, b_3, \ldots, b_n = \vec{b}$ of the filter $110_b$, the converter 54 may first determine the value C according equation (22) above.

Then, the converter 54 may determine the coefficients d and b for the filter $110_b$ according to equation (23) above.

Next, the converter 54 may determine the initial values for the outputs $z_2(k), z_3(k), \ldots, z_n(k) = \vec{z}$ of the summers $124_2$-$124_n$ of the filter $110_b$ according to equation (24) above.

Still referring to step 170, the converter 54 may store the determined values of $\vec{a}$ and $\vec{b}$, for the filter $110_b$ in a memory on board, or external to, the converter, Furthermore, the converter 54 may effectively store the determined value for BLOCK-DELAY in the configuration of the delay block $108_b$ of FIG. 6, and may effectively store the elements of $\vec{z}$ in the summers $124_2$-$124_n$ (FIG. 7) of the filter $110_b$ as the initial outputs of the summers.

Then, at step 172, the converter 54 determines whether there are any more samples k of $x_a(k)$ to process. If the converter 54 determines that there are more samples k of $x_a(k)$ to process, then the converter returns to step 152. But if the converter 54 determines that there are no more samples k of $x_a(k)$ to process, then the converter may halt the operation and updating of the filters $110_a$ and $110_b$.

Still referring to FIGS. 3 and 6-8, alternate embodiments of the converter 54 are contemplated. For example, one or more components of the converter 54, such as the conversion paths 104a and 104b, may be implemented in software, hardware, firmware, or a combination of two or more of software, hardware, and firmware. When a component is implemented in software, the function of the component may be performed by a computing apparatus such as a microprocessor or microcontroller executing instructions.

FIG. 9 is diagram of a circuit 180 of the voice unit $12_a$ of FIG. 1, according to an embodiment, where the circuit 180 is able to interpolate samples k' of $x_a(k')$ from samples k of $x_a(k)$ with relatively little additional complexity, relatively few additional components, and relatively little additional power consumption as compared to the circuit 30 of FIG. 2. Furthermore, like labels are used to reference components common to FIGS. 2, 3, and 9.

The circuit 180 is similar to the circuit 50 of FIG. 3, except that the sample-frequency-ratio estimator 56 determines the ratio r in response to $\hat{d}_a(k')$ instead of $y_a(k')$.

FIG. 10 is a flow diagram 190 of an algorithm that the sample-frequency-ratio estimator 56 of FIG. 9 may implement to determine and track the value of the frequency ratio r, according to an embodiment, where like numbers refer to steps common to the flow diagram 60 of FIG. 4.

The algorithm of FIG. 10 is similar to the algorithm of FIG. 4 except that in step 66, the estimator 56 determines the product P according to the following equation:

$$P = e_a(k') \cdot (\hat{d}_a(k'+1) - \hat{d}_a(k'-1)) \qquad (25)$$

instead of equation (8), and in step 92, the estimator determines whether there are more samples of $\hat{d}_a(k')$, not $y_a(k')$, to process. P in equation (25) indicates whether r is too high or too low for reasons similar to those discussed above in conjunction with FIG. 4 for P in equation (8).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple IC dies to form one or more ICs, these one or more ICs may be coupled to one or more other ICs. In addition, any described component or operation may be implemented/performed in hardware, software, or a combination of hardware and software. Furthermore, one or more components of a described apparatus or system may have been omitted from the description for clarity or another reason. Moreover, one or more components of a described apparatus or system that have been included in the description may be omitted from the apparatus or system.

What is claimed is:

1. An apparatus, comprising:
   a determiner configured to generate a representation of a difference between a first frequency at which a first signal is sampled and a second frequency at which a second signal is sampled;
   a converter configured to generate a second sample of the first signal at a second time in response to the representation and a first sample of the first signal at a first time;
   an adapter configured to generate a sample of a modifier signal in response to the second sample of the first signal; and
   a modifier configured to generate a modified sample of the second signal in response to a sample of the second signal and the sample of the modifier signal.

2. The apparatus of claim 1 wherein the representation of the difference between the first and second frequencies includes a ratio of the first frequency to the second frequency.

3. The apparatus of claim 1 wherein the determiner is configured to generate the representation of the difference between the first and second frequencies in response to a difference between samples of the second signal.

4. The apparatus of claim 1 wherein the determiner is configured to generate the representation of the difference between the first and second frequencies in response to a difference between inconsecutive samples of the second signal.

5. The apparatus of claim 1 wherein the determiner is configured to generate the representation of the difference between the first and second frequencies in response to the modified sample of the second signal.

6. The apparatus of claim 1 wherein the determiner is configured to generate the representation of the difference between the first and second frequencies equal to a combination of a prior representation of the difference and a constant.

7. The apparatus of claim 6 wherein the determiner is configured to update the constant.

8. The apparatus of claim 1 wherein the determiner is configured to limit the representation of the difference between the first and second frequencies between maximum and minimum values.

9. The apparatus of claim 1 wherein the determiner is configured to generate the representation of the difference between the first and second frequencies by:
- determining a difference between inconsecutive samples of the second signal;
- determining a product of the difference and the modified sample of the second signal;
- generating the representation equal to a sum of a prior representation of the difference between the first and second frequencies and a constant if the product is greater than zero;
- generating the representation equal to a difference between the prior representation and the constant if the product is less than zero; and
- generating the representation equal to the prior representation if the product equals zero.

10. The apparatus of claim 1 wherein the converter includes a filter.

11. The apparatus of claim 1 wherein the converter includes an infinite-impulse-response filter.

12. The apparatus of claim 1 wherein the converter:
- includes a filter configured to generate the second sample of the first signal, the filter having a filter delay, a coefficient, and an initial condition; and
- is configured to change at least one of the filter delay, coefficient, and initial condition of the filter in response to the representation of the difference between the first and second frequencies.

13. The apparatus of claim 1 wherein the converter:
- includes a filter configured to generate the second sample of the first signal, the filter having a filter delay, a coefficient, and an initial condition; and
- is configured
  - to determine, in response to the representation of the difference between the first and second frequencies, a delay between a sample of the first signal and a sample of the second signal; and
  - to change at least one of the filter delay, coefficient, and initial condition of the filter in response to the delay.

14. The apparatus of claim 1 wherein the adapter includes a filter configured to generate the sample of the modifier signal.

15. The apparatus of claim 1 wherein the modifier is configured to generate the modified sample of the second signal equal to difference between the sample of the second signal and the sample of the modifier signal.

16. The apparatus of claim 1, further comprising:
- a second converter configured to generate a third signal in response to samples of the first signal;
- a combiner configured to generate the second signal in response to a fourth signal and the third signal; and
- wherein the adapter is configured to generate the modifier signal approximately equal to a portion of the third signal.

17. A system, comprising:
- a first converter configured to generate a second signal at a first sampling rate in response to a first signal;
- a second converter configured to generate a third signal at a second sampling rate in response to the second signal and a fourth signal; and
- a signal modifier including
  - a determiner configured to generate a representation of a difference between the first and second sampling rates;
  - a third converter configured to generate a second sample of the first signal at a second time in response to the representation and a first sample of the first signal at a first time;
  - an adapter configured to generate a sample of a modifier signal in response to the second sample of the first signal; and
  - a modifier configured to generate a modified sample of the third signal in response to a sample of the third signal and the sample of the modifier signal.

18. The system of claim 17 wherein:
- the first converter includes a digital-to-analog converter; and
- the second converter includes an analog-to-digital converter.

19. The system of claim 17 wherein the second and fourth signals include respective audio signals.

20. The system of claim 17, further comprising:
- a speaker configured to convert the second signal into a first acoustic signal;
- a microphone configured to generate the fourth signal in response to a second acoustic signal and to generate an echo signal in response to the first acoustic signal;
- wherein the second converter is configured to generate the third signal in response to the second signal and the fourth signal by generating the third signal in response to the echo signal and the fourth signal;
- wherein the adapter is configured to generate the modifier signal approximately equal to the echo signal; and
- wherein the modifier is configured to generate a modified version of the third signal from which the echo signal is approximately cancelled.

21. The system of claim 20 wherein at least one of the first and second acoustic signals includes a voice signal.

22. The system of claim 20 wherein the modifier signal includes a digital approximation of the echo signal.

23. The system of claim 20, further comprising:
- a housing; and
- wherein the housing holds the first converter, second converter, signal modifier, speaker, and microphone.

24. The system of claim 17 wherein at least two of the first converter, second converter, and signal modifier are disposed on a same integrated-circuit die.

25. The system of claim 17, further comprising a computing apparatus coupled to at least one of the first converter, second converter, and signal modifier.

26. The system of claim 17 wherein at least a portion of the signal modifier is disposed on a computing apparatus.

27. A method, comprising:
- generating a representation of a difference between a first frequency at which a first signal is sampled and a second frequency at which a second signal is sampled;
- converting the representation and first samples of the first signal at respective first times into second samples of the first signal at respective second times;
- generating a modifier signal in response to the second samples of the first signal; and
- modifying the second signal in response to the modifier signal.

28. The method of claim 27 wherein generating the representation of the difference between the first and second frequencies includes:

determining a difference between inconsecutive samples of the modifier signal;

determining a product of the difference and a sample of the modified second signal;

generating the representation equal to a sum of a prior representation of the difference between the first and second frequencies and a constant if the product is greater than zero;

generating the representation equal to a difference between the prior representation and the constant if the product is less than zero; and generating the representation equal to the prior representation if the product equals zero.

29. The method of claim 27 wherein converting the representation and first samples of the first signal into second samples of the first signal includes:

filtering the first samples with a first filter to generate the second samples;

changing a parameter of the first filter; and filtering the first samples with a second filter while changing the parameter of the first filter.

30. The method of claim 27, further comprising:

converting the first signal into a first acoustic signal;

converting a combination of a second acoustic signal and an echo portion of the first acoustic signal into the second signal; and wherein generating the modifier signal includes generating the modifier signal approximately equal to the echo portion of the first acoustic signal.

31. The method of claim 27, further comprising:

converting the first signal into a first acoustic voice signal;

converting a combination of a second acoustic voice signal and an echo portion of the first acoustic voice signal into the second signal; and wherein generating the modifier signal includes generating the modifier signal approximately equal to the echo portion of the first acoustic voice signal.

32. A tangible computer-readable medium storing instructions that, when executed by a computing apparatus, cause the computing apparatus, or another apparatus under the control of the computing apparatus:

to generate a representation of a difference between a first frequency at which a first signal is sampled and a second frequency at which a second signal is sampled;

to convert the representation and first samples of the first signal at respective first times into second samples of the first signal at respective second times;

to generate a modifier signal in response to the second samples of the first signal; and to modify the second signal in response to the modifier signal.

* * * * *